United States Patent [19]

Thomas

[11] 3,877,028

[45] Apr. 8, 1975

[54] PCM ENCODER-DECODER APPARATUS

[75] Inventor: Robert M. Thomas, Maitland, Ontario, Canada

[73] Assignee: GTE Automatic Electric (Canada) Ltd., Brockville, Ontario, Canada

[22] Filed: Feb. 22, 1974

[21] Appl. No.: 444,891

[52] U.S. Cl. .................. 340/347 AD; 340/347 DA; 340/347 C; 325/38 R

[51] Int. Cl. ...................... H03k 13/17; H03k 13/00

[58] Field of Search ................. 340/347 C, 347 AD; 179/15 BD; 325/38 R

[56] References Cited

UNITED STATES PATENTS

| | | | |
|---|---|---|---|
| 3,049,701 | 8/1962 | Amdahl et al. | 340/347 |
| 3,579,108 | 5/1971 | Cutler | 325/38 |
| 3,653,035 | 3/1972 | Carbrey | 340/347 C |

OTHER PUBLICATIONS

A. E. Chatelon, "Integrated Circuits and Pulse Coding Mean New Gains for Telephony," Electronics, Sept. 19, 1966, pp. 139–148.

*Primary Examiner*—Eugene G. Botz
*Assistant Examiner*—Vincent J. Sunderdick
*Attorney, Agent, or Firm*—David M. Keay; Theodore C. Jay, Jr.; Robert T. Orner

[57] ABSTRACT

PCM encoder-decoder having a digital code generator which counts through a digital count during a comparison period. An analog voltage waveform generator sweeps in a non-linear manner from a maximum negative to a maximum positive voltage during the same period. The digital code generator and analog voltage waveform generator are synchronized so that during each instant of each comparison period they have corresponding values. At the start of each comparison period a sample of an audio voice signal to be encoded is trapped in a capacitor. During a comparison period the sample is compared with the output of the waveform generator. When equality is detected the count of the digital count generator at that instant is stored as a PCM digital signal for transmission with other PCM signals in accordance with known TDM techniques.

A PCM digital signal which is received in accordance with known TDM techniques is stored in a register prior to the start of a comparison period. During a comparison period the stored digital signal is compared with the output of the digital code generator. When equality is detected, the voltage of the analog voltage waveform generator at that instant is trapped in a capacitor. At the end of the comparison period the trapped charge is released as a pulse to a low-pass filter. A series of pulses is converted to a continuous audio signal by the low-pass filter.

10 Claims, 8 Drawing Figures

FOLDED BINARY CODE

| COUNTER STATE | DC1 | DC2 | DC3 | DC4 | DC5 | DC6 | DC7 | DC8 |
|---|---|---|---|---|---|---|---|---|
| +128 | 1 | 0 | 0 | 0 | 0 | 0 | 0 | 0 |
| +127 | 1 | 0 | 0 | 0 | 0 | 0 | 0 | 1 |
| • • • • | | | | | | | | |
| +3 | 1 | 1 | 1 | 1 | 1 | 1 | 0 | 1 |
| +2 | 1 | 1 | 1 | 1 | 1 | 1 | 1 | 0 |
| +1 | 1 | 1 | 1 | 1 | 1 | 1 | 1 | 1 |
| −1 | 0 | 1 | 1 | 1 | 1 | 1 | 1 | 1 |
| −2 | 0 | 1 | 1 | 1 | 1 | 1 | 1 | 0 |
| −3 | 0 | 1 | 1 | 1 | 1 | 1 | 0 | 1 |
| • • • • | | | | | | | | |
| −127 | 0 | 0 | 0 | 0 | 0 | 0 | 0 | 1 |
| −128 | 0 | 0 | 0 | 0 | 0 | 0 | 0 | 0 (NOT USED) |

COUNTER STARTS AT STATE −127 AND PROGRESSES TO STATE +128.

PCM ENCODER-DECODER APPARATUS

BACKGROUND OF THE INVENTION

This invention relates to communication carrier systems employing pulse code modulation (PCM). More particularly, it is concerned with apparatus for PCM encoding and decoding audio signals.

Communication systems employing PCM techniques are wellknow. Briefly, in a typical PCM system an audio signal is sampled at an 8 KHz rate and each sample is converted to an 8-bit digital code. The coded signals for 24 voice channels are time division multiplexed (TDM) for transmission over a single line. At the receiving end of the line the signals for the 24 channels are demultiplexed and the 8-bit codes for each channel are decoded and passed through a low-pass filter to provide audio signals which are reconstructions of the original audio signals.

In typical PCM systems the relationship between the analog audio signals and digital signals is non-linear. For reasons well understood in the communication art the audio signals are compressed in the process of converting to the 8-bit digital code. Standard compression curves are followed in this procedure.

Apparatus presently employed for PCM encoding and decoding must sample the analog voice signal on each channel and convert each analog sample to a digital signal during each sampling period. For example, if a typical 8 KHz sampling rate is employed with a 24 channel system, the equipment has available a period of approximately 5 microseconds to take an analog sample and convert the sample to a digital signal. During this process the signal is compressed. Received digital signals must be converted to analog signals and expanded at the same processing rate. The apparatus must include fast acting sampling gates, circuitry for handling analog pulses at high speed, and high sppeed analog-to-digital and digital-to-analog converters. Thus, apparatus presently available for PCM encoding and decoding is relatively complex employing a large number of expensive, high speed analog circuits.

SUMMARY OF THE INVENTION

Apparatus in accordance with the present invention for encoding a continuous analog signal into digital signals and for decoding digital signals to a continuous analog signal simplifies the equipment employed in PCM systems. The encoding-decoding apparatus includes a digital code generating means which produces a sequence of digital code signals and an analog voltage generating means which produces an analog voltage waveform. The analog voltage generating means and the digital code generating means are synchronized so that for each digital code signal there is a corresponding analog voltage signal at the same instant. The apparatus includes a means for receiving a continuous analog input signal and a sampling means for sampling the analog input signal. A sample of the analog input signal is compared with the analog voltage waveform by an analog comparison means which produces an output signal when the two voltages are equal. The digital code generating means and the analog comparison means are coupled to a digital storage means. In response to an output signal from the analog comparison means the digital storage means stores a digital signal equal to the digital code signal being produced by the digital code generating means. Thus, a digital signal corresponding to the voltage of the sample is stored in the digital storage means.

For decoding digital signals the apparatus includes means for receiving digital input signals and a digital signal storage means for storing a received digital input signal. A digital signal comparison means is coupled to the digital signal storage means and to the digital code generating means. The digital signal comparison means compares the stored digital input signal with the sequence of digital code signals produced by the digital code generating means and produces an output signal when the two digital signals are equal. An analog storage means is coupled to the analog voltage generating means and to the digital signal comparison means and in response to an output signal from the digital signal comparison means stores an analog signal equal to the analog signal being produced by the analog voltage generating means. Thus, an analog signal corresponding to the received digital input signal is stored in the analog storage means. The apparatus includes a low-pass filter means and a gating means coupled between the analog storage means and the low-pass filter means. The gating means permits the analog signal stored in the analog storage means to be applied to the low-pass filter means. The low-pass filter means produces a continuous analog signal from a series of analog signals applied thereto from the analog storage means by the gating means.

BRIEF DESCRIPTION OF THE DRAWINGS

Additional objects, features, and advantages of encoding-decoding apparatus in accordance with the present invention will be apparent from the following detailed discussion together with the accompanying drawings wherein.

DETAILED DESCRIPTION OF THE INVENTION

General

Figure 1:
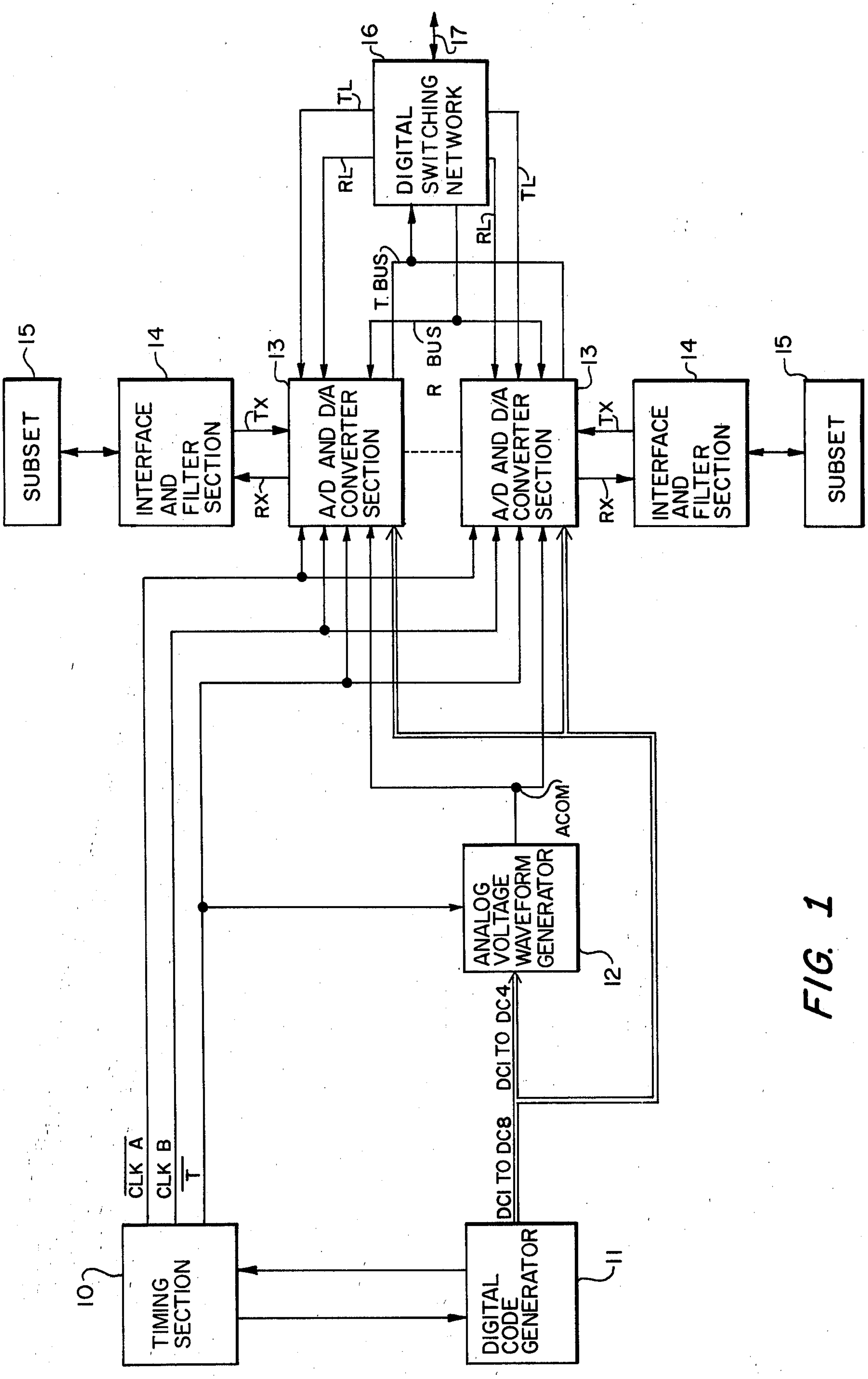
FIG. 1 is a block diagram of encoding-decoding apparatus in accordance with the present invention.

The apparatus as illustrated in the block diagram of FIG. 1 is an encoder-decoder employed in a PCM system. The encoder-decoder receives audio voice signals from several telephone subsets, the audio signals are sampled, and the samples encoded to digital signals in accordance with a non-linear compression curve. Several sets of digital signals are applied to a digital switching network for transmission in a TDM system. The digital switching network demultiplexes incoming PCM signals and directs them to the appropriate channels in accordance with known TDM techniques. Each set of digital signals is decoded to an analog pulse signal in accordance with the non-linear compression curve. The analog pulse signals for each channel are applied to a low-pass filter which produces a continuous analog signal reconstruction of the audio voice signal for applying to the appropriate telephone subset.

For purposes of discussion the specific embodiment of the apparatus as discussed herein operates in accordance with a typical standard PCM system employing a sampling rate of 8,000 Hz, a complete operating cycle or frame of 125 microseconds. For purpose of discussion it is assumed that this system accommodates 24 voice channels on a single line by employing TDM techniques. The digital signals are encoded in an 8-bit code.

Figure 6:
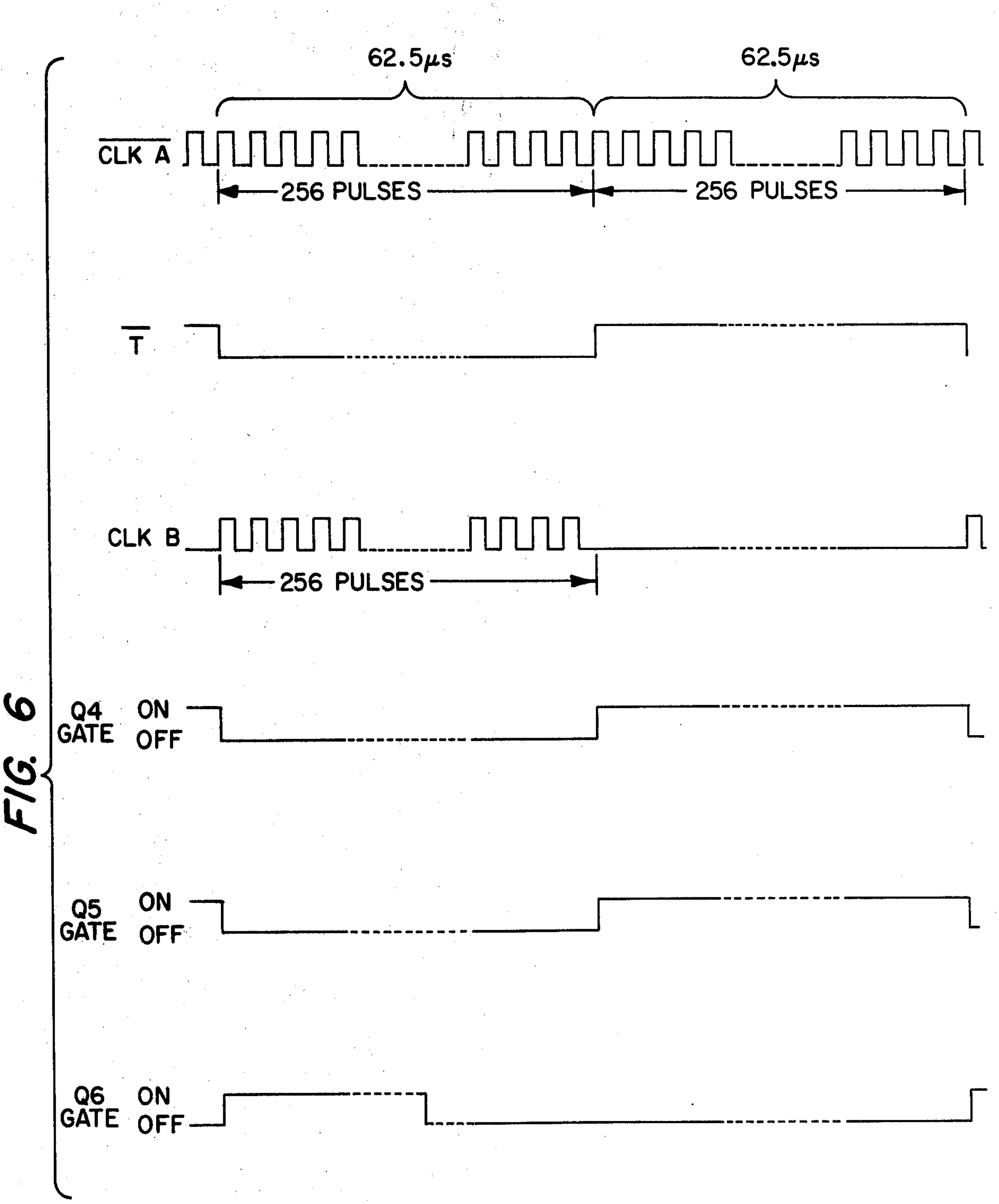
FIG. 6 is a timing diagram illustrating various signals and conditions throughout the apparatus during an operating cycle.

The apparatus includes a timing section 10 which provides a signal on line $\overline{T}$ which is low or 0 during a first 62.5 microsecond period and high or 1 during a second 62.5 microsecond period of each operating cycle of 125 microseconds. The timing section also produces $\overline{\text{CLK A}}$ and CLK B clock signals each at the rate of 4,096 KHz. These signals are used for timing and control throughout the apparatus and are shown in timing diagram of FIG. 6.

Figures 7, 8:
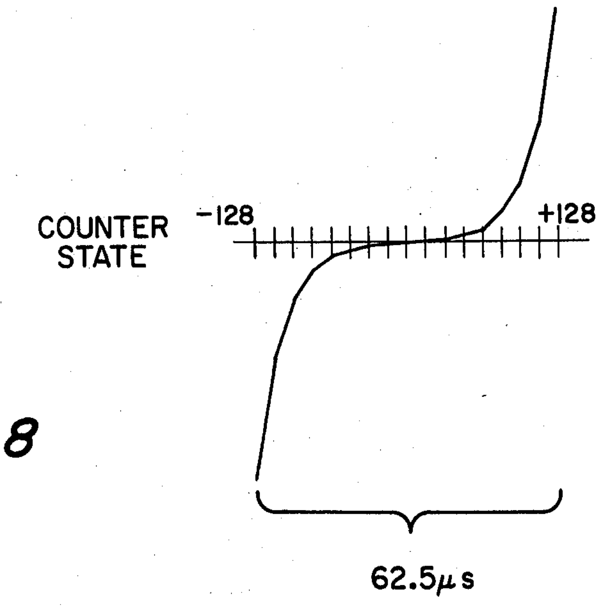
FIG. 7 is a table showing a folded binary code as produced by the digital code generator of FIG. 2.
FIG. 8 is a curve of the analog voltage waveform produced by the analog voltage waveform generator of FIG. 3.

The digital code generator 11 counts pulses provided at the 4,096 KHz rate by the timing section. The digital code generator counts through a recurring sequence of 256 pulses each 62.5 microsecond period. A decoded 8-bit digital signal of the count in the generator is provided at its output lines DC1 to DC8. The output signal is in a folded binary code which is shown in the table of FIG. 7.

An analog voltage waveform generator 12 produces a non-linear voltage curve, labeled ACOM, under control of the $\overline{T}$ signal and DC2 to DC4 bits. The voltage curve is shown in FIG. 8 and is produced during the 62.5 microseconds of the first period of each operating cycle. The digital code generator 11 and analog voltage waveform generator 12 are synchronized so that for each digital code signal from the digital code generator 11 there is corresponding analog voltage signal from the analog voltage waveform generator 12. During the second period the curve slews back to the starting voltage in preparation for the next cycle.

In the specific embodiment shown the elements of the timing section 10, digital code generator 11, and analog voltage waveform generator 12 are shared in common by all of the 24 voice channels of the system. It is also possible to utilize these elements with additional sets of 24 channels. Under certain circumstances it may be desirable to duplicate certain of these elements for each voice channel or for groups of voice channels. Synchronization must be provided between duplicate elements employed in equipment handling a set of 24 channels over a single line.

Each voice channel employs an analog-to-digital and digital-to-analog converter section 13 and interface and filter section 14 and a telephone subset 15. The audio voice signal from the subset 15 passes through the interface section 14 and is applied on line TX to the converter section 13. The audio voice signal is sampled once every operating cycle (125 microseconds) by the converter section 13 and the analog sample is encoded to a corresponding 8-bit digital signal in accordance with the compression curve of FIG. 8 and the folded binary code shown in the table of FIG. 7. The 8-bit digital signal is stored in the converter section and the bits are read out in series on a T BUS to a digital switching network 16. The digital signals may be applied to a transmission line 17 as shown in FIG. 1 in accordance with known TDM techniques or may otherwise be handled by employing known digital switching techniques.

During each operating cycle of 125 microseconds an incoming 8-bit digital signal in series-bit format is received for each channel by the switching network 16 and directed to the appropriate converter section 13 over an R BUS. The 8-bit digital signal is converted to a corresponding analog pulse signal in accordance with the compression curve of FIG. 8 and the folded binary code in the table of FIG. 7. Analog pulse signals are applied over an RX line at the rate of one pulse each 125 microseconds to the interface and filter section 14. A low-pass filter in the section 14 produces a smooth, continuous analog signal from the analog pulses thereby providing a reconstructed audio voice signal to the telephone subset 15.

Timing and Digital Code Generator Sections

Figure 2:
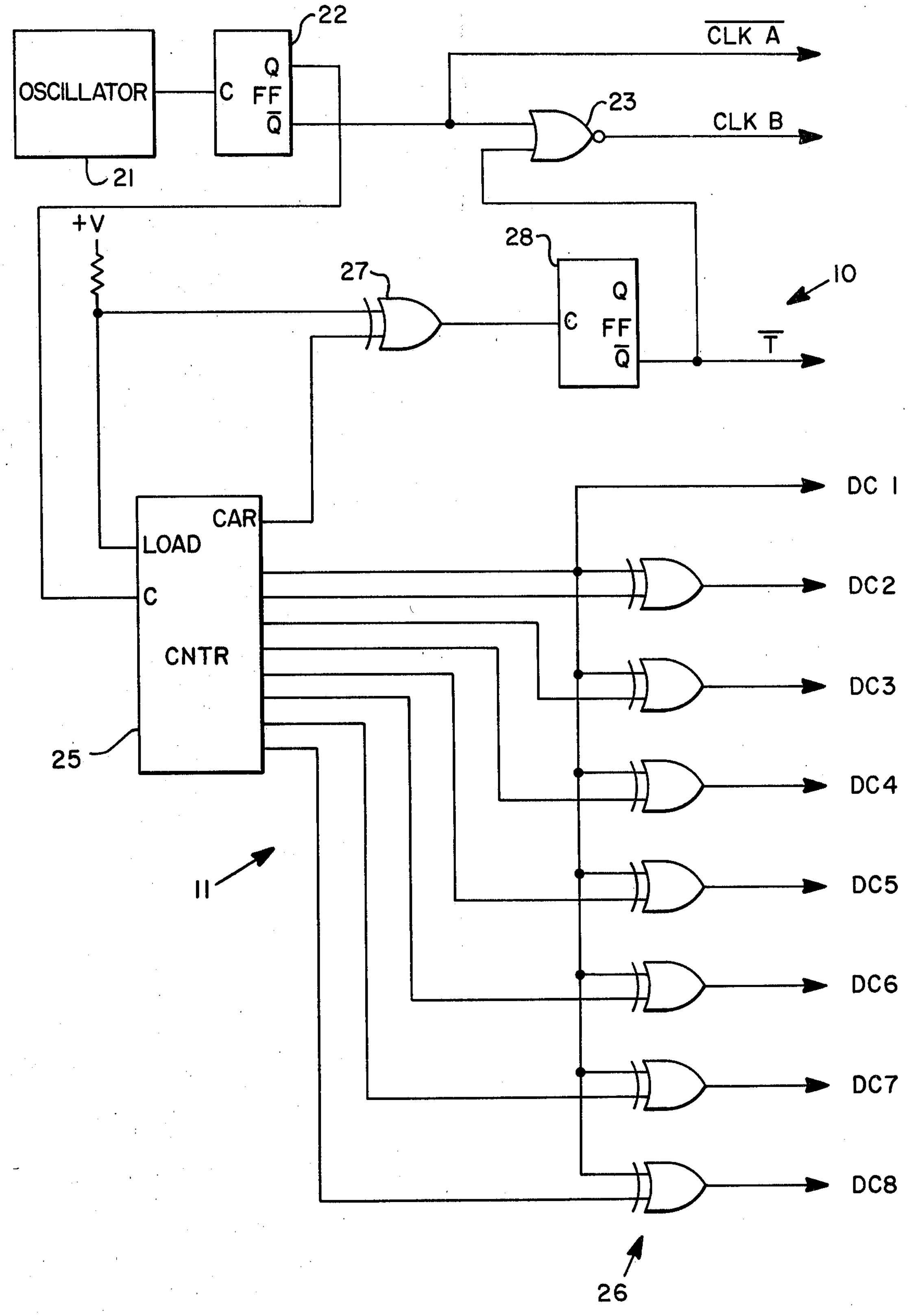
FIG. 2 is a logic diagram of the timing section and digital code generator employed in the apparatus of FIG. 1.

The timing and digital code generator sections 10 and 11 are illustrated in FIG. 2. A master oscillator 21 produces squarewave output pulses at the rate of 8,192 KHz. A flip-flop 22 serves as a divider to produce alternating squarewave pulses of 4,096 KHz at each of its outputs. The output signal at the $\overline{Q}$ output is the $\overline{\text{CLK A}}$ signal. This signal is produced continuously as shown in the timing diagram of FIG. 6. The $\overline{Q}$ output is also connected to one input of a NOR gate 23. The Q output is connected to the clock input of a counter 25 in the digital code generator 11.

The counter 25 is enabled continually by a high level voltage at its load input. The counter counts continuously through a recurring sequence of 256 states in response to clock pulses from flip-flop 22. Eight output connections from the counter are applied to a network of exclusive-OR gates 26 as shown in FIG. 2. The counter counts through 256 states designated −128 to +128 and produces signals DC1 through DC8 at the outputs of the exclusive-OR gates 26. The 8-bit digital signals on lines DC1 to DC8 conform to the folded binary code shown in the table of FIG. 7.

The carry output terminal of the counter 25 is connected to one input of an exclusive-OR gate 27. The other input to the exclusive-OR gate 27 is held at a high level. The output of the exclusive-OR gate 27 is applied to a flip-flop 28. The $\overline{T}$ line is connected to the $\overline{Q}$ output of the flip-flop 28. Thus, the counter 25 causes the $\overline{T}$ signal to change levels upon the completion of each 256 pulses as shown in the timing diagram of FIG. 6.

The $\overline{Q}$ output of the flip-flop 28 is also connected as the second input to the NOR gate 23. The output signal from the NOR gate 23, labeled CLK B, is a 4,096 KHz squarewave signal which occurs only during the first 62.5 microsecond period of each operating cycle as shown in the timing diagram of FIG. 6. The $\overline{\text{CLK A}}$, CLK B, and $\overline{T}$ signals control the operation of other sections of the apparatus.

Analog Voltage Waveform Generator

Figure 3:
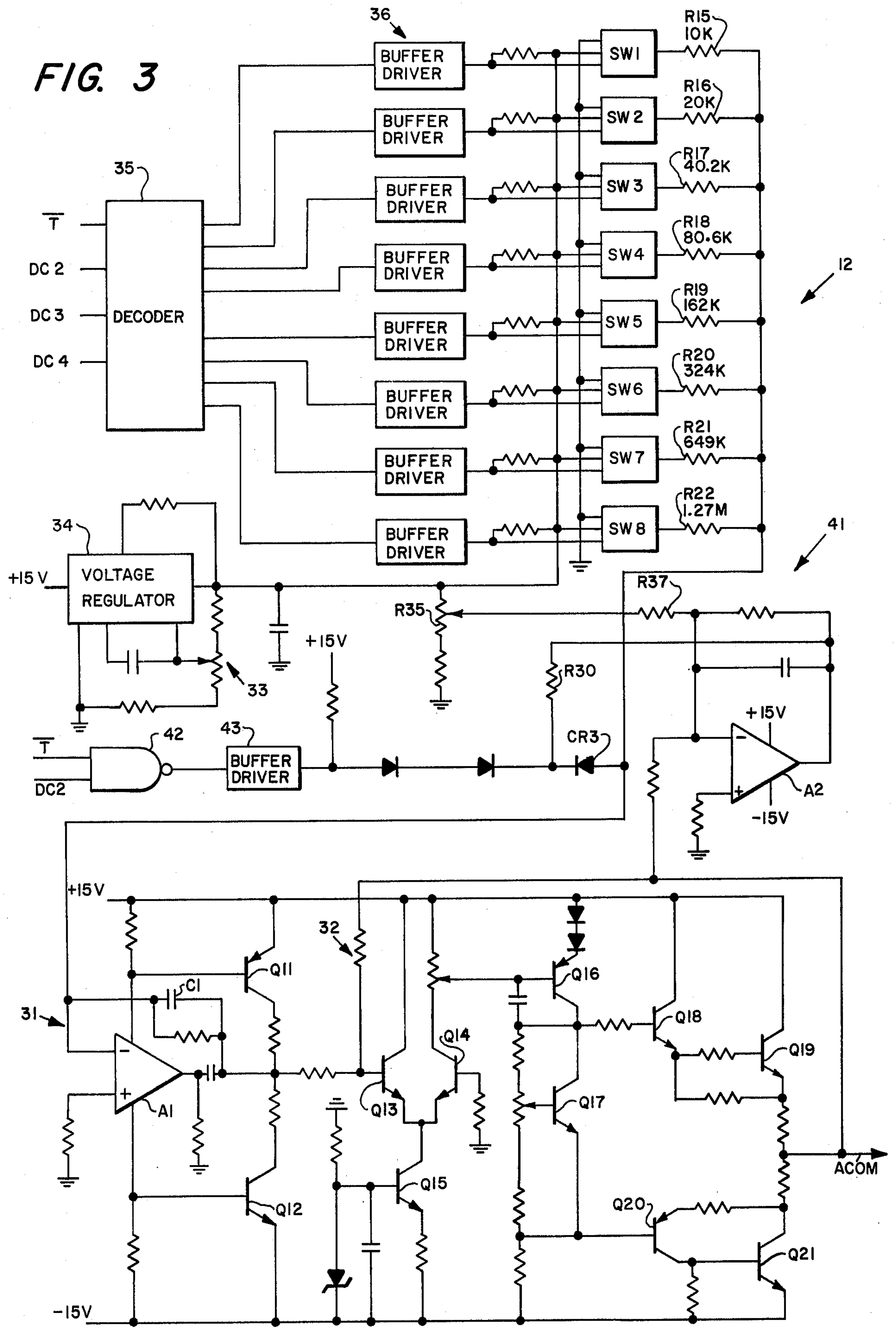
FIG. 3 is a detailed diagram of an analog voltage waveform generator employed in the apparatus of FIG. 1.

The analog voltage waveform generator 12 is illustrated in FIG. 3. The voltage curve produced by the analog voltage waveform generator is shown in FIG. 8. The analog voltage waveform generator includes an integrator circuit 31 employing an integrator operational amplifier A1 together with a PNP-NPN transistor combination Q11 and Q12 to provide additional driving power. The output of the integrator circuit is applied to an inverter 32 employing a differential amplifier of transistors Q13 and Q14 with transistors Q16, Q17, Q18, Q19, Q20, and Q21 to provide additional driving power. A positive reference voltage of 10 volts from a source of reference voltage 33 including a voltage regulator 34 is applied to the inverting or - input of the integrator operational amplifier A1 through one of a set of resistances R15 through R22 as determined by which of switches SW1 through SW8 is closed by the output of a decoder 35 acting through buffer drivers 36. The output of the intergrator circuit 31 decreases at a rate depending upon the value of the resistance connected between the reference voltage source and the - input and the value of the integrating capacitor C1 in accordance with the relationship (V REF/R C1) where V REF is the reference voltage, R is the value of the resistance, and C1 is the value of the integrating capacitor C1.

The voltage waveform generator 12 operates as follows during the first period of each cycle to produce the ACOM waveform signal as shown in FIG. 8. The $\overline{T}$ signal enables the decoder 35 when it goes low at the start of a first period. At this time the bits on the DC2, DC3, and DC4 lines are all 0 causing switch SW1 to be activated, or closed, and the other seven switches to be inactive, or open. Thus, resistance R15 is connected between the reference voltage and the input to the integrator operational amplifier A1, and the inverted output of the integrator circuit, the ACOM signal, ramps upward as shown in the first portion of the curve of FIG. 8.

This situation continues after a count of sixteen clock pulses have been applied to the counter 25 causing the bit on the DC4 line to change from a 0 to 1. This action changes the decoder output, opening switch SW1 and closing switch SW2. For the next sixteen pulses the resistance R16 is connected in series between the reference voltage and the - input to the integrator operational amplifier A1. Since resistance R16 is twice that of resistance R15, the output of the integrator, and also the ACOM signal, changes at one-half the previous rate as shown in the curve of FIG. 8. The decoder output continues to change each sixteen pulses doubling the value of the series resistance and thus dropping the ramp rate by one-half as shown in the curve of FIG. 8.

Halfway through the first period, when the ACOM signal passes through zero as shown in the curve of FIG. 8, the DC2, DC3, and DC4 bits cause switch SW8 to remain closed. Sixteen clock pulses later the input to the decoder 35 changes opening switch SW8 and closing switch SW7. This action continues closing the switches in reverse order and producing the resulting ACOM signal of FIG. 8.

The ACOM signal, as explained, is generated as a series of straight lines. The curve approximates the standard D2 compression curve widely used in the communication art. Since this curve is generated under the direct control of the DC2, DC3, and DC4 bits from the digital code generator 11, the digital code signals DC1 through DC8 and the analog signal ACOM are synchronized. Therefore, each state of the counter 25 as designated by bits DC1 through DC8 has a corresponding analog voltage as indicated by the curve of FIG. 8.

As explained previously, since the decoder 35 is enabled by a 0 on the $\overline{T}$ line, the ACOM signal is generated only during the first period of each operating cycle. The analog voltage waveform generator is returned to the proper starting condition for generating the next ACOM signal by a feedback arrangement 41 which operates during the second period of each operating cycle. The feedback arrangement includes a feedback operational amplifier A2 having its inverting or - input coupled to the ACOM line. The output of the feedback operational amplifier A2 is a negative potential which is fed back to the input of the integrator operational amplifier A1. A control arrangement including a NAND gate 42 prevents the feedback operational amplifier A2 from having any effect during the second and third quarters of the second period.

During the first period while the ACOM curve is being generated as explained above, the output of the NAND gate 42 and consequently the buffer-driver 43 is high. The voltage at the cathode of diode CR3 is therefore sufficiently high to prevent flow of current therethrough and prevent the output of the feedback operational amplifier A2 from having any effect on the operation of the integrator circuit 31. When the $\overline{T}$ and DC2 signals both become high, the output of the NAND gate 42 changes to low. Diode CR3 is then biased to conduction and current flows from the output of the feedback operational amplifier A2 through resistance R30 to the integrator circuit 31. The output of the integrator circuit 31 ramps upward at a rate determined by the resistance R30, the capacitance C1, and the output voltage of amplifier A2. These values are such that by the end of the third quarter of the second period when the DC2 signal changes to a 0 the integrator circuit output has returned to its starting level and the ACOM signal is at its maximum negative value.

The output voltage of the feedback operational amplifier 42 is proportional to the DC component of the ACOM signal plus a constant offset introduced by the resistance R37. Any DC component in the ACOM signal during the first period causes a compensating change in the rate at which the voltage on the ACOM line slews back to the starting condition during the second period. Thus, the ACOM signal waveform is symmetrical about a fixed residual DC offset. This offset can be reduced to zero by adjustment of the potentiometer R35 to produce an ACOM waveform which crosses zero volts exactly halfway through the first period as shown in FIG. 8.

The analog voltage waveform generator as described briefly herein is described in greater detail and claimed in application Ser. No. 444,888 filed concurrently herewith by John T. Lighthall and Robert M. Thomas entitled "Voltage Waveform Generator."

Analog-to-Digital and Digital-to-Analog Converter Section

Figure 4:
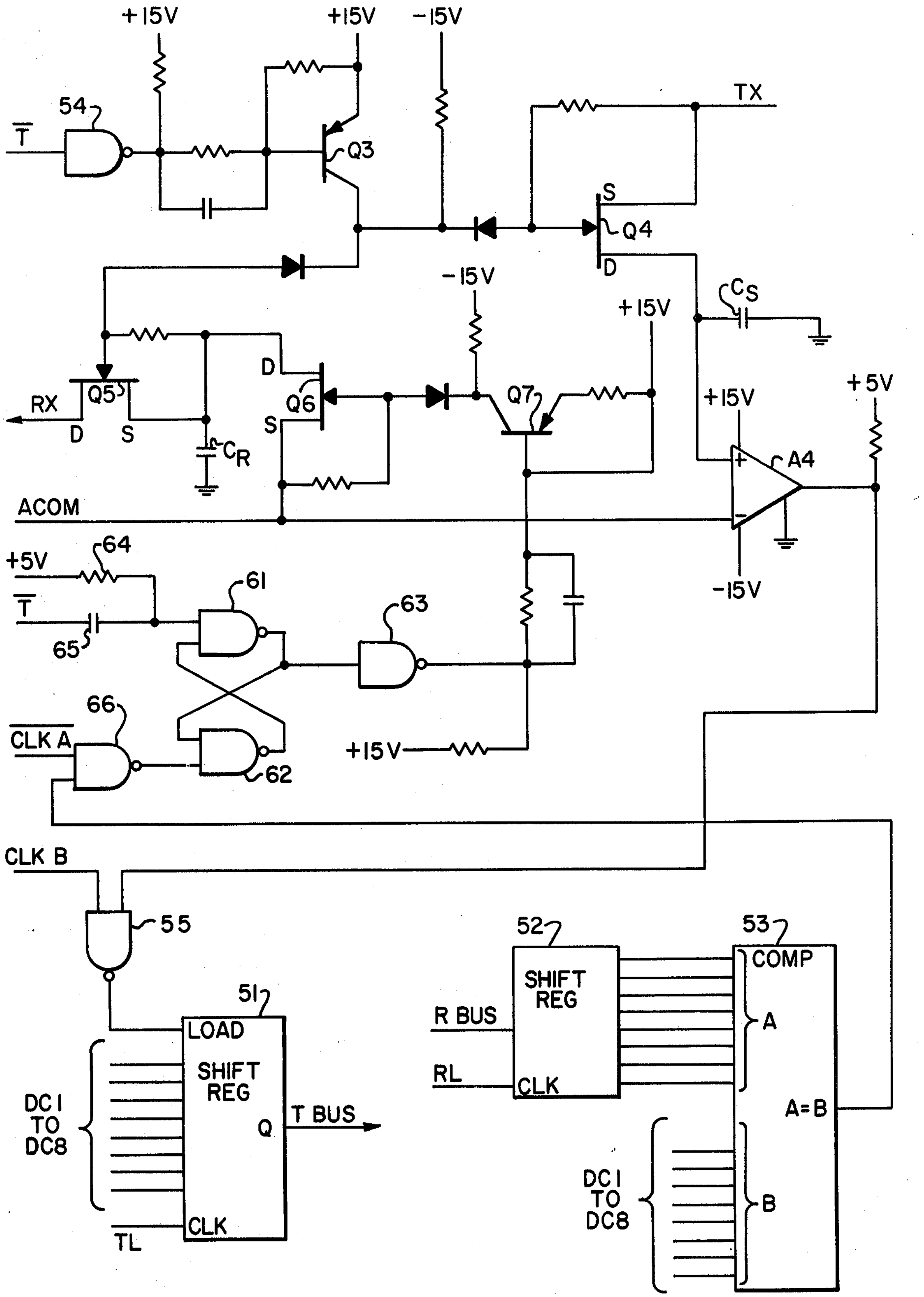
FIG. 4 is a detailed diagram of an analog-to-digital and digital-to-analog converter section.

A converter section 13 as shown in FIG. 4 is employed for each voice channel of the system. Each converter section includes a sampling arrangement for receiving the audio voice signal from the telephone subset 15 by way of the interface and filter section 14 on the TX line. A sampling gate Q4 causes a sample of the audio signal to be stored in a capacitor $C_S$ at the start of the first period of each operating cycle. The stored sample is compared with the analog voltage signal ACOM by a comparator including an analog comparator A4. When the analog voltage signal becomes equal to the stored sample the corresponding 8-bit digital code on lines DC1 to DC8 is loaded in a parallel-to-serial shift register 51. During the second period of the cycle the stored 8-bit digital signal is read out of the shift register and applied in series-bit format to the digital switching network 16. During the second period of each operating cycle an 8-bit digital-signal is stored in a serial-to-parallel shift register 52. During the next first period the stored 8-bit signal is compared with the digital code signal from the digital code generator in a comparator 53, and when the digital signals are equal the corresponding value of the ACOM signal is trapped in a capacitor $C_R$ by the action of a gate Q6. On the start of the second period gate Q5 passes the voltage stored in capacitor $C_R$ as a pulse on the RX line to the interface and filter section 14.

The analog sampling gate Q4 is an FET having its source connected to the TX line and its drain connected to one terminal of the sampling capacitor $C_S$. The other terminal of the capacitor $C_S$ is connected to ground. The gate of transistor Q4 is coupled to the collector of a PNP transistor Q3 which has its base coupled to the $\overline{T}$ line by an inverter 54. The presence of the $\overline{T}$ signal during the second period causes the PNP transistor Q3 to conduct thereby holding gate Q4 on. With gate Q4 providing a conductive path therethrough the voltage on capacitor $C_S$ follows the audio voice signal on line TX. At the termination of the $\overline{T}$ signal starting the first period of an operating cycle the PNP transistor Q3 becomes nonconducting. Thus, the gate Q4 is turned off producing an open circuit and trapping the voltage of the audio signal occurring at that instant as a sample in the capacitor $C_S$.

The sample voltage is applied to the + input of the analog comparator A4 and the ACOM signal is applied to the − input. At the beginning of the first period when the ACOM signal is at its maximum negative value, the output of the analog comparator A4 is positive or logical 1. Thus, CLK B pulses pass through NAND gate 55 loading successive digital code signals into the parallel-to-serial shift register 51. When at some point during the first period the potential of the ACOM signal slightly exceeds the potential of the sample stored in the capacitor $C_S$, the output of the analog comparator A4 changes to a low level or logical 0. This action can be considered as occurring when the two voltages are essentially equal.

The logical 0 signal from the analog comparator A4 is applied to the NAND gate 55 preventing further CLK B pulses from passing. Thus, the parallel-to-serial shift register 51 retains the DC1 to DC8 bits then present therein. (As shown in the timing diagram of FIG. 6 the CLK B signal is present only during the first period of each cycle.) Since the digital code bits DC1 to DC8 from the digital code generator 11 and the ACOM signal are synchronized, the digital signal held in the shift register 51 is corresponding digital value for the analog audio signal stored in the capacitor $C_S$. The contents of the shift register 51 may then be read out serially on the T BUS in response to clock pulses on line TL during the second period of the operating cycle under control of the digital switching network 16.

Input digital signals received from the digital switching network 16 are converted to analog signals by trapping a sample of the ACOM signal in the capacitor $C_R$ at the proper instant during a first period. The sampling gate Q6 is an FET having its drain connected to one terminal of the capacitor $C_R$ and its source connected to the ACOM line. The sampling gate Q6 is driven by a PNP transistor Q7 coupled to its gate. The transistor -7 is controlled by an arrangement including a flip-flop of two cross-coupled NAND gates 61 and 62. The output of the flip-flop is applied to the base of transistor Q7 through an inverter 63. One input to the flip-flop is a positive voltage applied through a resistance 64 in parallel with the $\overline{T}$ signal applied by way of a capacitor 65. The output of the digital comparator 53 and the $\overline{\text{CLK A}}$ signal are applied to a NAND gate 66 which has its output connected to another input of the flip-flop. Reading out of the sample stored in the capacitor $C_R$ to produce a pulse on the RX line is controlled by an FET output gate Q5 having its source connected to the one terminal of the capacitor $C_R$. The gate of the FET output gate Q5 is coupled to PNP transistor Q3.

During the second period of each operating cycle the positive voltage applied to the input of the flip-flop of NAND gates 61 and 62 causes the NAND gate 61 to be ON and NAND gate 62 to be OFF and the output of the inverter 63 to be high. The PNP transistor Q7 is therefore nonconducting holding the FET gate Q6 OFF. At the same time, as is explained hereinabove, the high level $\overline{T}$ signal causes transistor Q3 to be conducting thereby holding the FET output gate Q5 ON. Also during the second period of each cycle, the digital switching network 16 applies clock pulses on line RL to the serial-to-parallel shift register 52 to load therein an 8-bit digital input signal.

At the start of a first period the high level signal on the $\overline{T}$ line terminates. As explained previously, when the input to the inverter 54 goes low, transistor Q3 is biased to nonconduction. This action turns output gate Q5 OFF producing an open circuit between the capacitor $C_R$ and line RX. The $\overline{T}$ transition also produces a momentary low voltage pulse at the input to the NAND gate 61 causing the flip-flop to change states with NAND gate 61 OFF and NAND gate 62 ON. Transistor Q7 is thereby biased to conduction turning sampling gate Q6 ON and providing a conductive path therethrough. Thus, the voltage across the sampling capacitor $C_R$ follows the voltage of the ACOM waveform.

The 8-bit digital input signal stored in the serial-to-parallel shift register 52 is applied to the digital comparator 53. The 8-bit digital code signal from the digital code generator 11 is also applied to the comparator. During the first period when the digital code signal has counted up to the same digital value as the stored input signal, the comparator 53 produces a high level output signal. This signal together with a $\overline{\text{CLK A}}$ pulse produces a low level pulse to NAND gate 62 causing the flip-flop to change states with NAND gate 62 OFF and NAND gate 61 ON. The outputs of NAND gates 61 and inverter 63 change, switching transistor Q7 to nonconductive and consequently switching sampling gate Q6 OFF and producing an open circuit between the ACOM line and the capacitor $C_R$. The voltage of the ACOM signal at the instant gate Q6 turns OFF is trapped in capacitor $C_R$. Since the ACOM waveform is synchronized with the 8-digital code signals from the digital code generator 11, the trapped voltage is an analog signal corresponding to the digital input signal stored in the shift register 52. As explained previously, at the termination of the first period of the operating cycle and the start of the second period output gate Q5 is turned ON producing a conductive path from the capacitor $C_R$ to the RX line. The voltage stored in the sampling capacitor $C_R$ is then passed as an analog signal pulse to the interface and filter section 14 over the RX line.

Thus, the analog-to-digital converter portion of the section samples analog signals received from a subset and converts the samples to corresponding digital code signals which may be transmitted as PCM signals employing TDM techniques. The digital-to-analog portion receives incoming digital signals, converts the digital signals to corresponding analog signal pulses, and passes the pulses to the interface and filter section 14.

Interface and Filter Section

Figure 5:
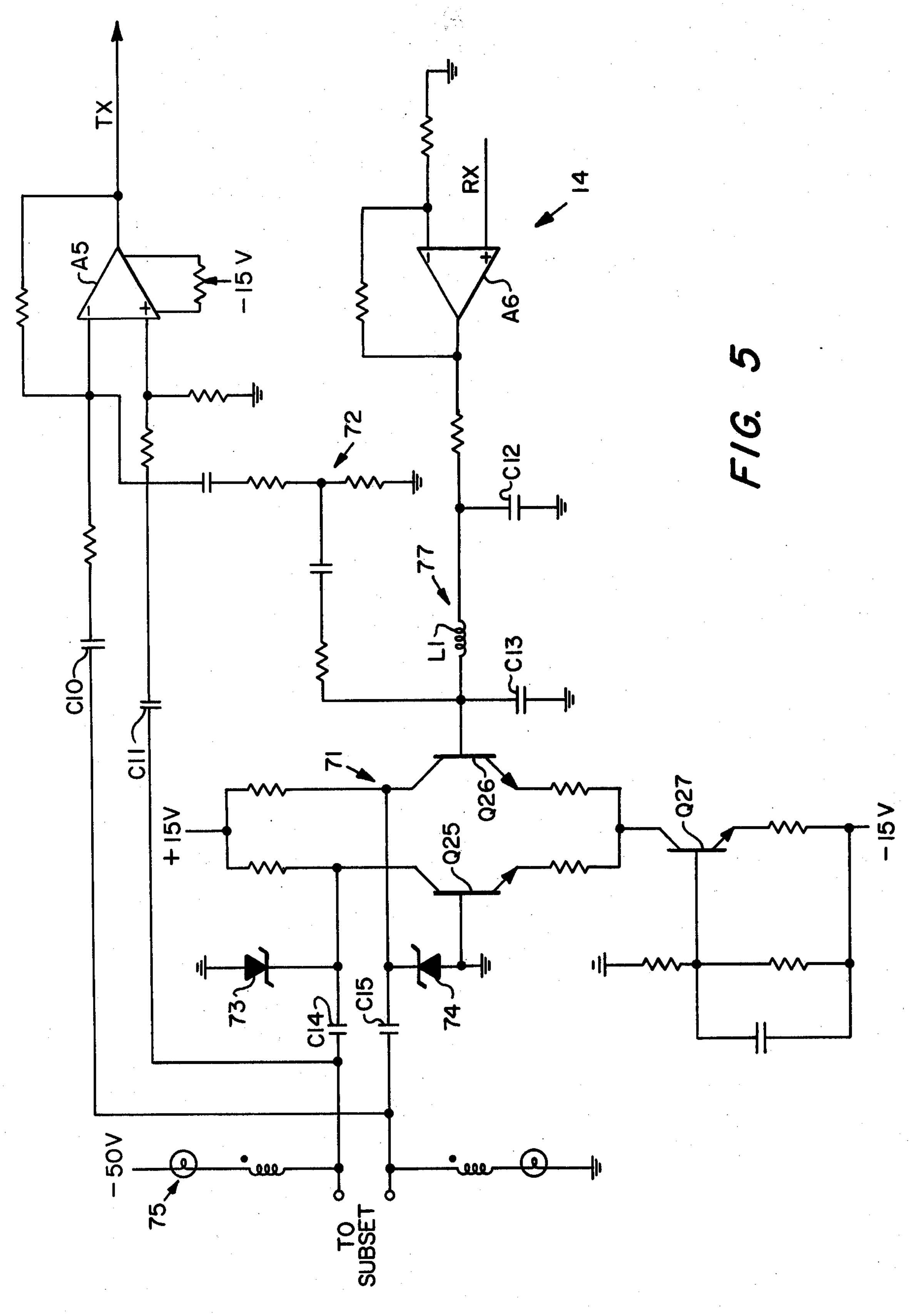
FIG. 5 is a circuit diagram of an interface and filter section.

An interface and filter section 14 as illustrated in FIG. 5 is employed for each channel to couple the converter section 13 to the telephone subset 15. The audio voice signal from the subset is coupled by capacitor C10 and C11 to an operational amplifier A5. The amplifier A5 operates as a differential amplifier to reject common-mode signals. The amplified output of amplifier A5 is applied to the converter section 13 for the channel by the TX line. Analog pulse signals from the converter section 13 are received over the RX line and applied to a high input impedance, unity-gain amplifier A6. The pulses are received at the 8 KHz rate, one pulse being received at the start of the second period of each operating cycle. From the amplifier A6 the pulses are applied to a low-pass filter 77 of capacitors C12 and C13 and inductance L1. The filter produces a smooth continuous analog curve which is a reconstruction of the original voice signal. The reconstructed voice signal is applied to a line amplifier 71 including transistors Q25, Q26, and Q27. The output of the amplifier 71 is coupled by way of capacitors C14 and C15 to the subset.

In order to prevent the received audio signals from being retransmitted through the amplifier A5 on the TX line, a compensating network 72 is connected between the input to the line amplifier 71 and the input to amplifier A5. The network generates a signal at the input amplifier A5 which cancels the effects of the received signal coupled to the input of the amplifier A5 from the output of the line amplifier 71. The values of the components in the compensating networks 72 are chosen to provide reasonably low reflection across the band from 200 to 400 Hz.

The circuit also includes zener diodes 73 and 74 to protect the circuit components against voltage surges on the line. A conventional battery-feed arrangement 75 is connected to the lines to the subset.

The foregoing circuit is described in greater detail and claimed in application Ser. No. 444,889 filed concurrently herewith by Robert M. Thomas entitled "Active Hybrid Circuit."

Operation

Briefly, the encoder-decoder apparatus as described hereinabove operates in the following manner to encode a voice signal from a telephone subset to digital PCM signals, and to decode received digital PCM signals to analog pulse signals from which a continuous analog voice signal is constructed.

During each period of each operating cycle the digital code generator 11 counts through a sequence of 256 pulses at a 4,096 KHz rate to produce an 8-bit folded binary output code on lines DC1 to DC8 as illustrated by the table of FIG. 7. During each first period the analog voltage waveform generator 12 produces a non-linear waveform which progresses from a maximum negative value to a maximum positive value in accordance with the voltage curve illustrated in FIG. 8. The outputs of the digital code generator 11 and analog voltage waveform generator 12 are synchronized so that for each value of one there is a corresponding value of the other.

An analog voice signal being transmitted from a subset 15 is amplified by amplifier A5 and conducted on the TX line to the converter section 13. During the second portion of each operating cycle the FET sampling gate Q4 remains ON and the voltage across the sampling capacitor $C_S$ follows the voice signal. At the start of the first period of each cycle, the gate Q4 is turned OFF trapping the voltage of the analog voice signal at that instant in the capacitor $C_S$. During the first period the voltage on the ACOM line sweeps through the waveform of FIG. 8. When the voltage on the ACOM line exceeds the voltage of the sample stored in the capacitor $C_S$, the output of the analog comparator A4 changes from a 1 to a 0. CLK B pulses (CLK B pulses occur only during the first period of each cycle) no longer pass through NAND gate 55 and the parallel-to-serial shift register 51 stops loading successive digital signals and holds the bits present on the DC1 to DC8 lines at that instant. The contents of the shift register 51 are shifted out serially on the T BUS during the subsequent second period of the cycle in accordance with known TDM techniques.

Also during the second period of each cycle an 8-bit digital input signal is received over the R BUS and loaded into the serial-to-parallel shift register 52. During the subsequent first period the digital signal in the shift register 52 is compared with the digital code signal on lines DC1 to DC8 from the digital code generator 11. In addition, at the start of the first period the sampling gate Q6 is turned ON and the output gate Q5 is turned OFF. At the point during the first period when the digital count on lines DC1 to DC8 reaches the count of the digital signal stored in the shift register 52, the digital comparator 53 produces an output signal. This signal is gated by a CLK A pulse to trigger the flip-flop of NAND gates 61 and 62 and turn the sampling gate Q6 OFF. A voltage equal to that of the ACOM waveform at that instant is thus trapped in the capacitor $C_R$.

At the start of the subsequent second period output gate Q5 is turned ON and the charge stored in capacitor $C_R$ produces an analog pulse over line RX. Pulses are applied over line RX to the low-pass filter 77 by way of amplifier A6 at an 8 KHz rate (one pulse at the start of the second period of each operating cycle). The low-pass filter 77 smooths the pulses into a continuous waveform of an audio voice signal. This signal is amplified by the line amplifier 71 and applied to the telephone subset 15.

Encoder-decoder apparatus as described provides several advantages over apparatus previously employed. Each analog sample is converted to a digital signal during a relatively long period regardless of the number of channels in the system. In the specific embodiment described this period is 62.5 microseconds. As stated previously, prior art systems of 24 channels employing the same sampling rate must convert each sample to a digital signal in approximately 5 microseconds. Thus, high speed handling and converting of analog signals is avoided. The sampling gate may be a simple FET gate as shown rather than a relatively expensive diode gate such as typically employed in prior art systems. Both the digital code generator and the analog voltage waveform generator sweep through their operating signals in a period of 62.5 microseconds. Therefore, the circuitry is less critical than that required when conversion must be accomplished in 5 microseconds. In addition, the voltage waveform generator can be used with a large number of channels, the number being limited only by the loading placed on the output of the waveform generator. There are no time or speed limitations. Furthermore, since conversion from analog to digital takes place earlier in the encoding process, more of the signal handling is by digital techniques which are less expensive and less critical to implement.

While there has been shown and described what is considered a preferred embodiment of the present invention, it will be obvious to those skilled in the art that various changes and modifications may be made therein without departing from the invention as defined by the appended claims.

What is claimed is:

1. Apparatus for encoding a continuous analog signal into digital signals and for decoding digital signals to a continuous analog signal including in combination digital code generating means for producing a sequence of digital code signals;

analog voltage generating means for producing an analog voltage waveform and being synchronized with said digital code generating means whereby for each digital code signal a corresponding analog voltage signal is produced at the same instant;

means for receiving a continuous analog input signal;

sampling means for sampling the analog input signal received by said means;

analog comparison means coupled to the sampling means and to the analog voltage generating means for comparing a sample of the analog input signal with said analog voltage waveform and for producing an output signal when the voltage of the analog voltage waveform is equal to the sample;

digital storage means coupled to the digital code generating means and to the analog comparison means for storing a digital signal equal to the digital code signal being produced by the digital code generating means in response to an output signal from the analog comparison means whereby a digital signal corresponding to the voltage of the samples is stored in the digital storage means;

means for receiving digital input signals;

digital input signal storage means for storing a digital input signal received by said means;

digital signal comparison means coupled to the digital input signal storage means and to the digital code generating means for comparing the stored digital input signal with said sequence of digital code signals and for producing an output signal when the two digital signals are equal;

analog storage means coupled to the analog voltage generating means and to the digital signal comparison means for storing an analog signal equal to the analog signal being produced by the analog voltage generating means in response to an output signal from the digital signal comparison means whereby an analog signal corresponding to the received digital input signal is stored in the analog storage means;

low-pass filter means; and gating means coupled between the analog storage means and the low-pass filter means for permitting an analog signal stored in the analog storage means to be applied to the low-pass filter means;

said low-pass filter means being operable to produce a continuous analog signal in response to a series of analog signals applied thereto from the analog storage means by the gating means.

2. Apparatus for encoding a continuous analog signal into digital signals and for decoding digital signals to a continuous analog signal including in combination digital code generating means for producing a sequence of digital code signals during a first period of each operating cycle;

analog voltage generating means for producing an analog voltage waveform during the first period of each operating cycle and being synchronized with said digital code generating means whereby for each digital code signal a corresponding analog voltage signal is produced at the same instant during the first period of each operating cycle;

analog signal receiving means for receiving a continuous analog input signal;

sampling means for sampling the analog input signal received by said analog signal receiving means at the same point during each operating cycle;

analog comparison means coupled to the sampling means and to the analog voltage generating means for comparing a sample of the analog input signal with said analog voltage waveform during the first period of each operating cycle and for producing an output signal when the voltage of the analog voltage waveform is equal to the sample;

digital storage means coupled to the digital code generating means and to the analog comparison means for storing a digital signal equal to the digital code signal being produced by the digital code generating means in response to an output signal from the analog comparison means whereby a digital signal corresponding to the voltage of the sample is stored in the digital storage means during the first period of each operating cycle;

digital signal receiving means for receiving digital input signals;

digital input signal storage means for storing a digital input signal received by said digital signal receiving means prior to the first period of each operating cycle;

digital signal comparison means coupled to the digital input signal storage means and to the digital code generating means for comparing the stored digital input signal with said sequence of digital code signals during the first period of each operating cycle and for producing an output signal when the two digital signals are equal;

analog storage means coupled to the analog voltage generating means and to the digital signal comparison means for storing an analog signal equal to the analog signal being produced by the analog voltage generating means in response to an output signal from the digital signal comparison means whereby an analog signal corresponding to the received digital input signal is stored in the analog storage means during the first period of each operating cycle;

low-pass filter means; and analog output gating means coupled between the analog storage means and the low-pass filter means for permitting an analog signal stored in the storage means to applied to the low-pass filter means at the same point during a second period of each operating cycle;

said low-pass filter means being operable to produce a continuous analog signal in response to a series of analog signals applied thereto from the analog storage means by the analog output gating means.

3. Apparatus in accordance with claim 2 wherein said digital code generating means produces a sequence of digital code signals each of which varies from the preceding signal by an equal digital amount; and said analog voltage generating means produces an analog voltage waveform of continuously increasing voltage.

4. Apparatus in accordance with claim 3 wherein said digital code generating means includes clock pulse generating means for producing periodic clock pulses; and counting means coupled to the clock pulse generating means for counting clock pulses during the first period of each operating cycle and for producing a sequence of digital code signals representing the number of pulses counted; and said analog voltage generating means produces a non-linear analog voltage waveform of continuously increasing voltage.

5. Apparatus in accordance with claim 2 including control means operable to produce a first control signal condition during the first period of each operating cycle and to produce a second control signal condition during the second period of each operating cycle, the first period and second period of each operating cycle being of equal time duration; and wherein said sampling means includes sample storage means for storing a sample of the analog input signal, and sample gating means connected between the analog signal receiving means and the sample storage means and being coupled to the control means, said sample gating means being operable to provide an open circuit during a first control signal condition to hold a sample of the analog input signal in the sample storage means;

said analog storage means includes a storage element, and analog storage gating means connected between the analog voltage generating means and the storage element, said analog storage gating means being coupled to the digital signal comparison means and to the control means, said analog storage gating means being operable to provide an open circuit during a second control signal condition and to be switched to provide a conduction path therethrough when the control signal condition changes from the second control signal condition to the first control signal condition at the beginning of the first period of each operating cycle, said analog storage gating means being operable to be switched to provide an open circuit in response to an output signal from said digital signal comparison means whereby a voltage equal to the voltage of the analog voltage waveform at the instant the digital signal comparison means produces the output signal is stored in the storage element; and said analog output gating means is connected between the storage element and the low-pass filter means and is coupled to the control means, said analog output gating means being operable to provide a conductive path therethrough during a second control signal condition.

6. Apparatus in accordance with claim 5 wherein said sample gating means is operable to provide a conductive path therethrough while the control means is producing the second control signal condition and is operable to provide an open circuit while the control means is producing the first control signal condition whereby the voltage of the analog input signal at the start of the first period of each operating cycle becomes the sample stored in the sample storage means; and said analog output gating means is operable to provide an open circuit while the control means is producing the first control signal condition and is operable to provide a conductive path therethrough while the control means is producing the second control signal condition whereby an analog signal stored in the storage element is applied to the low-pass filter means at the start of the second period of each operating cycle.

7. Apparatus in accordance with claim 6 wherein said digital code generating means produces a sequence of digital code signals each of which varies from the preceding signal by an equal digital amount; and said analog voltage generating means produces an analog voltage waveform of continuously increasing voltage.

8. Apparatus in accordance with claim 7 wherein said digital code generating means includes clock pulse generating means for producing periodic clock pulses, and counting means coupled to the clock pulse generating means for counting clock pulses during the first period of each operating cycle and for producing a sequence of digital code signals representing the number of pulses counted; and said analog voltage generating means produces a non-linear analog voltage waveform of continuously increasing voltage.

9. Apparatus in accordance with claim 8 wherein said conting means counts through a recurring sequence of states during each period of each operating cycle;

said control means is coupled to said counting means and is operable to change from producing one control signal condition to the other in response to completion of each sequence of states.

10. Apparatus in accordance with claim 9 wherein said analog storage gating means includes a gating element connected between the analog voltage generating means and the storage element; and gate control means coupled to the gating element, said digital signal comparison means, and said control means; said gate control means having a first operating state during which said gating element provides a conductive path therethrough and a second operating state during which said gating element provides an open circuit;

said gate control means being maintained in said second operating state by said second control signal condition from the control means;

said gate control means being operable to be switched from said second operating state to said first operating state in response to the control signal condition from the control means changing from the second control signal condition to the first control signal condition; and said gate control means being operable to be switched from said first operating state to said second operating state in response to an output signal from said digital signal comparison means.

* * * * *